Patented Aug. 15, 1950

2,518,676

UNITED STATES PATENT OFFICE 2,518,676

ANIMALIZING OF CELLULOSE ACETATE

Thomas S. Gardner, Kingsport, Tenn., assignor to Eastman Kodak Company, Rochester, N. Y., a corporation of New Jersey No Drawing. Application May 15, 1946, Serial No. 670,038

4 Claims. (Cl. 260—211)

This invention relates to a process of reacting upon cellulose acetate (or similar lower fatty acid ester) with ethylene imine to form a product capable of being dyed with wool-type dyes.

The lower fatty acid esters of cellulose (which herein will be used to refer to the cellulose esters, the principal acyl content of which are fatty acid groups of 2–4 carbon atoms) are used for various products, such as filaments and textiles, films or sheets, molded products, etc., the coloring of which is often desirable. Acid wool dyes are known to be markedly stable in their color characteristics but cellulose acetate is not susceptible to dyeing therewith without some special treatment which has been referred to as "animalizing."

Various schemes for rendering fibers susceptible to dyeing by acid wool-type dyes have been proposed but most of those schemes involve the formation of the fibers and then treating those fibers with the "animalizing" agent resulting often in a superficial effect. In the case of many types of fibers this treatment is sufficiently deep, however, to impart the desired properties. Cellulose ester fibers, however, are ordinarily of a gelatinous, resistant nature, and superficial treatment thereof would not produce sufficient or uniform animalization thereof.

One object of my invention is to prepare a cellulose compound susceptible to substantial dyeing with wool-type dyes. Another object of my invention is to prepare cellulose compounds soluble in organic solvents. A further object of my invention is to prepare cellulose compounds, solutions of which may be extruded to form filaments, sheeting and the like. Other objects of my invention will appear herein.

I have found that lower fatty acid esters of cellulose having free hydroxyl groups will react with ethylene imine to form nitrogen-containing cellulose esters which are readily susceptible to dyeing with wool-type dyes. I have found that these nitrogen-containing esters may be dissolved in organic solvents to form products which are susceptible to dyeing by wool-type dyes.

The cellulose esters suitable as the starting material for use in my process are lower fatty acid esters of cellulose which contain hydroxyl groups, preferably 1–4 hydroxyl groups per 24 cellulose carbon atoms. Esters, such as cellulose acetates, cellulose acetate propionates, cellulose acetate butyrates, cellulose propionates, and cellulose butyrates having the prescribed hydroxyl content are suitable for use in reactions in accordance with my invention. The amount of nitrogen which is introduced by the reaction in accordance with my invention is nearly proportional to the amount of free hydroxyl present in the cellulose ester. For instance, if a considerable nitrogen content is desired, a cellulose ester having more than four hydroxyls per 24 cellulose carbon atoms, such as up to 6 or even up to 8 hydroxyls may be employed. The percentage of $\beta$-amino ethoxyl groups introduced into the cellulose ester is governed by the hydroxyl content of the cellulose ester employed, assuming that the reaction is carried out to substantial completion.

The reaction may be carried out preferably by treating the cellulose ester with the ethylene imine in gaseous form. If desired, however, the ethylene imine may be dissolved in an organic solvent, preferably a high boiling liquid and the reaction can be thereby carried out under suitable temperature and other conditions. Whether or not the solvent is also a solvent of the cellulose ester is immaterial as both methods of treatment are included within the scope of my invention.

In the gaseous method of reacting cellulose ester with ethylene imine the ester and the ethylene imine may be placed in a closed vessel, such as an autoclave and the temperature is increased to a point where the ethylene imine is vaporized and the mass is maintained at this vaporizing temperature for the desired time, sufficient to impart the selected nitrogen content to the cellulose ester.

If desired, the reaction may be carried out at an elevated temperature in which ethylene imine vapors are passed through the mass of cellulose ester for the time to impart the desired nitrogen content to the cellulose ester.

After the cellulose ester has been reacted upon with ethylene imine to form $\beta$-amino ethoxyl cellulose acetate (if cellulose acetate is used) it may then be dissolved in an organic solvent, such as dioxan, acetic acid, pyridine, methylene chloride-methyl alcohol, or the like and extruded in the form of sheets or filaments to form products readily susceptible to dyeing with wool-type dyes.

The temperature and time of treatment are not particularly critical but it is ordinarily desirable that these conditions be so adjusted that the reaction goes to substantial completion. For instance, treatment for four hours at 100° C. is ordinarily suitable but the temperature used may range from 50 to 150° C. or more and the time from two to six hours or more.

The following examples illustrate my invention:

*Example 1.*—Twenty parts of a hydrolyzed cellulose acetate having an acetyl content of 35.7% were placed in a pressure bottle in which 4 parts of ethylene imine were also placed. The bottle was kept at a temperature of 100° C. for four hours. The cellulose acetate was removed from the bottle, washed with water, dilute sulfuric acid, and then with water again. On drying a light yellow product was obtained which was soluble in dioxan but not completely soluble in acetone. Films were cast from the dioxan solutions. These films were clear and strong and were capable of drafting at 180–185° C. The films were also found to be susceptible to dyeing with xylene brilliant blue (a typical wool dye). The films upon analysis were found to have a nitrogen content of 1.06%.

*Example 2.*—A cellulose acetate propionate yarn-type ester having an acetyl content of 38.6% and a propionyl content of 1% was placed in a pressure bottle with ethylene imine and subjected to treatment at 100° C. for four hours in a similar manner to that described in the preceding example. The product was found to be soluble in dioxan and in acetic acid, but difficultly soluble in acetone. Films were cast from dioxan solutions of the product obtained, and these films could be dyed with xylene brilliant blue. The product which was obtained by this reaction was a β-amino ethoxyl cellulose acetate propionate. The films prepared therefrom were found to be capable of drafting at 180–185° C. An analysis showed a nitrogen content of 0.54%.

I claim:

1. A method of preparing a cellulose ester capable of being dyed with wool-type dyes which comprises heating a mixture essentially consisting of a lower fatty acid ester of cellulose containing 1–4 hydroxyl groups per 24 cellulose carbon atoms and ethylene imine at 50–150° C. for 2–6 hours whereby a β-amino ethoxyl cellulose ester is obtained.

2. A method of preparing a cellulose ester susceptible to dyeing with wool-type dye which comprises heating a mixture essentially consisting of cellulose acetate containing 1–4 hydroxyl groups per 24 cellulose carbon atoms and ethylene imine at 50–150° C. for 2–6 hours whereby a β-amino ethoxyl cellulose acetate is obtained.

3. A method of preparing a cellulose ester susceptible to dyeing with wool-type dye which comprises heating a mixture essentially consisting of a cellulose acetate propionate containing 1–4 hydroxyl groups per 24 cellulose carbon atoms and ethylene imine at 50–150° C. for 2–6 hours whereby a β-amino ethoxyl cellulose ester is obtained.

4. A method of preparing cellulose esters susceptible to dyeing with wool-type dyes which comprises heating a mixture essentially consisting of a lower fatty acid ester of cellulose containing 1–4 hydroxyl groups per 24 cellulose carbon atoms and ethylene imine at 100° C. for 4 hours whereby a β-amino ethoxyl cellulose ester is obtained.

THOMAS S. GARDNER.

REFERENCES CITED

The following references are of record in the file of this patent:

UNITED STATES PATENTS

| Number | Name | Date |
|---|---|---|
| 1,777,970 | Hartmann | Oct. 7, 1930 |
| 2,072,870 | Dreyfus | Mar. 9, 1937 |
| 2,094,100 | Dreyfus | Sept. 28, 1937 |
| 2,097,120 | Fink et al. | Oct. 26, 1937 |
| 2,261,294 | Schlack | Nov. 4, 1941 |

FOREIGN PATENTS

| Number | Country | Date |
|---|---|---|
| 486,564 | Great Britain | June 7, 1938 |